United States Patent
Braun

(10) Patent No.: US 6,692,038 B2
(45) Date of Patent: Feb. 17, 2004

(54) PLUG CONNECTION DEVICE

(75) Inventor: Hans-Peter Braun, Renfrizhausen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/753,478

(22) Filed: Jan. 3, 2001

(65) Prior Publication Data

US 2001/0017466 A1 Aug. 30, 2001

(30) Foreign Application Priority Data

Jan. 7, 2000 (DE) .......................................... 100 00 369

(51) Int. Cl.$^7$ ................................................ F16L 35/00
(52) U.S. Cl. ........................ 285/319; 285/921; 285/423
(58) Field of Search .............................. 285/319, 921, 285/382, 423

(56) References Cited

U.S. PATENT DOCUMENTS

| | | | | |
|---|---|---|---|---|
| 921,691 | A | * | 5/1909 | Friday .......................... 285/921 |
| 2,889,089 | A | * | 6/1959 | Herrick et al. ............... 285/921 |
| 3,245,703 | A | | 4/1966 | Manly |
| 3,588,149 | A | * | 6/1971 | Demler ........................ 285/110 |
| 4,419,100 | A | * | 12/1983 | Alexander ................... 285/921 |
| 4,673,200 | A | * | 6/1987 | Miyauchi ..................... 285/921 |
| 4,970,863 | A | * | 11/1990 | Cunningham ................ 285/319 |
| 4,991,882 | A | * | 2/1991 | Gahwiler ..................... 285/319 |
| 5,104,157 | A | * | 4/1992 | Bahner ........................ 285/921 |
| 5,178,615 | A | * | 1/1993 | Steer et al. .................. 285/921 |
| 5,228,724 | A | * | 7/1993 | Godeau ....................... 285/921 |
| 5,261,708 | A | * | 11/1993 | Steer .......................... 285/921 |
| 5,267,757 | A | * | 12/1993 | Dal Palu ..................... 285/319 |
| 5,324,080 | A | * | 6/1994 | McNaughton et al. ........ 285/39 |
| 5,413,386 | A | * | 5/1995 | Dal Palu ..................... 285/319 |
| 5,551,734 | A | * | 9/1996 | Sulzye et al. ................ 285/921 |
| 5,609,370 | A | * | 3/1997 | Szabo et al. ................. 285/319 |
| 5,984,378 | A | * | 11/1999 | Ostrander et al. ........... 285/319 |

FOREIGN PATENT DOCUMENTS

EP 0 234 465 9/1990

* cited by examiner

Primary Examiner—Eric K. Nicholson
(74) Attorney, Agent, or Firm—Michael J. Striker

(57) ABSTRACT

A plug connection device for pressure medium conduits, for binding or connection of fuel conduits has a housing provided with arresting edges, a plug insertable in the housing and having holding elements which form-lockingly engage the arresting edges, the plug having a coupling region which in a not plugged in condition of the plug is formed as a substantially ring-shaped circumferential collar and during insertion in an associated receiving portion of the housing is deformed so that the holding elements engaging the arresting edges are formed, or the holding elements are formed at an end side on a tubular plug portion produced by extrusion.

9 Claims, 5 Drawing Sheets

PLUG CONNECTION DEVICE

BACKGROUND OF THE INVENTION

The present invention relates to a plug connection device for pressure medium conduits.

European patent document EP 0 234 465 B1 discloses a plug connection device. This device has the disadvantage that in addition to a plug and a housing which receives the plug in anchored condition, an additional component is required. This additional component operates as a safety cap against unauthorized release of the connection and must be plugged over the plug and the housing. The plug connection device is therefore difficult to handle, and also because of the additional component additional and costly manufacturing steps are required.

In addition, the plug of the prior art is injection molded, and therefore for each plug size a special injection molding tool is needed.

SUMMARY OF THE INVENTION

Accordingly, it is an object of the present invention to provide a plug connection device which avoids the disadvantages of the prior art.

In keeping with these objects and with others which will become apparent hereinafter, one feature of present invention resides, briefly stated, in a plug connection device which has a plug with a coupling region which, in not inserted condition of the plug, is formed as a substantially ring-shaped circumferential collar and, during insertion into an associated receiving portion of the housing, is deformed so as to form a holding means which engages the arresting edges, or the holding means are formed at one side of a tubular plug portion produced by extrusion.

The plug connection device of the present invention has the advantage that the components which belong to the plug connection device, namely the plug and the housing can be produced in a cost favorable manner, and a simple handling with simultaneously reliably obtained anchoring is provided, without additional components such as a safety cap.

Since the tubular plug portion alternatingly is first produced by extrusion and the holding means is then formed at the end side for example by thermal conversion, the manufacturing costs for the inventive plug connection are low. In particular cost intense manufacture of injection molding tools for different plug sizes can be dispensed with.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
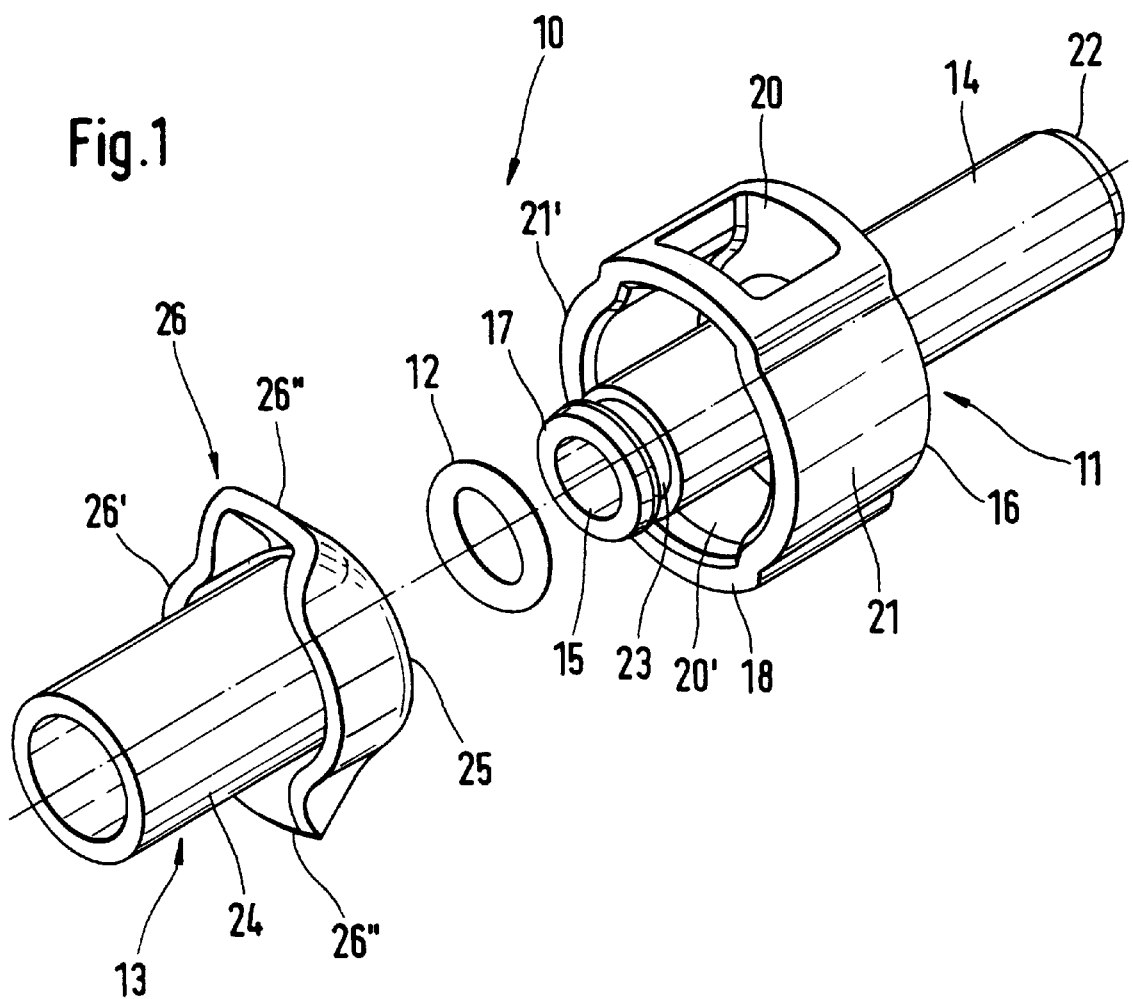
FIG. 1 is an exploded view of a first preferable embodiment of a plug connection device in accordance with the present invention with a plug and a housing as well as an O-sealing ring.

A plug connection device shown in FIG. 1 is identified as a whole with reference numeral 10. It has a housing 11 which serves as a plug bushing, an O sealing ring 12, and a plug 13. The housing 11 includes the tubular portion 14 with a throughgoing opening 15 which extends axially along its longitudinal extension. A radially projecting sleeve 16 is formed of one piece with the outer wall of the tubular portion 14 and extends coaxially to the opening 15. The sleeve 16 has an end side 18 which is open toward a coupling-side end 17 of the tubular portion 14 for receiving the plug 13. It also has another end side which forms a connection to the tubular portion 14. The end side 18 of the sleeve 16 which is open toward the coupling-side end of the housing 11 is formed as a hollow contour. The hollow contour is limited in a radial direction at one side by the outer wall of the tubular portion 14 and at the other side by the radial inner side of the sleeve 16. Therefore the radial jacket surface of the sleeve 16 forms a circumferential outer collar.

The outer collar has two throughgoing passages 20, 20' which are located diametrically opposite to one another in a peripheral direction. The throughgoing passages 20, 21 in the outer collar are arranged in peripheral direction between two diametrically opposite guiding jaws 21, 21' which have a reduced diameter relative to the remaining peripheral region of the outer collar. The guiding jaw 21, 21' are formed as cylinder jacket segments arranged at the same radius. A region located in peripheral direction between this cylinder jacket 7 has a corresponding throughgoing passage 20, 20' and is formed as a cylindrical jacket segment with a greater radius than the guiding jaws 21, 21'. The outer collar is therefore defined by two pairs of the cylindrical jacket segments of two different inner radii.

An end 22 of the housing 11 which faces away from the plug 13 is provided for receiving a pressure medium conduit, while the opening 15 of the housing 11 serves as a flow passage for the pressure medium. A radial circumferential groove 23 is provided at the coupling-side end 17 of the housing 11 on the outer wall of the tubular portion 14. It receives the O-sealing ring 12. The plug 13 of the plug connection device 10 has a tube 24 with an inner diameter substantially corresponding to the outer diameter of the associated tubular portion 14 of the housing 11. Therefore the tube 24 of the plug 13 is pluggable on or displaceable on the tubular portion 14 of the housing 11.

Figure 2:
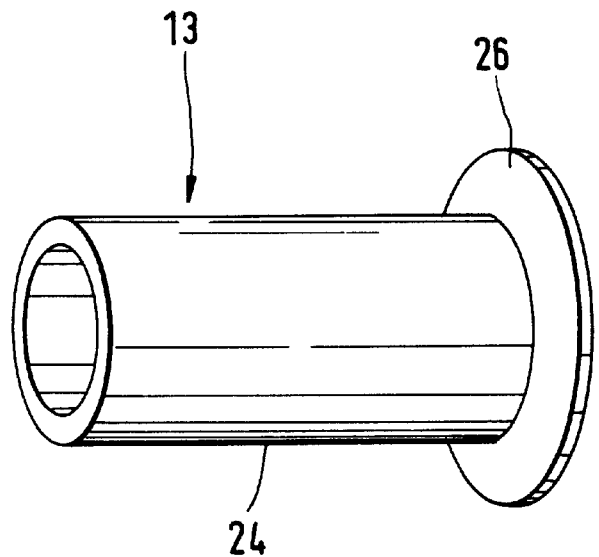
FIG. 2 is a perspective view of the plug in a not plugged-in condition.

As can be seen from FIG. 2, the tube 24 of the plug 13 in a not-plugged in condition is provided at its coupling-side end 25 with a radial outwardly projecting and circumferential collar 26. The collar 26 is connected with the tube 24 of one piece and preferably is composed of a flexible material. The collar 26 has a greater outer radius than the open end side 18 of the hollow contour of the housing 11 and comes therefore first, as can be seen from FIG. 1 during fitting or plugging of the plug on the tubular portion 14 of the housing 11, to abutment at the end side 18 of the sleeve 16 which faces the collar. During a further axial displacement of the plug 13 in direction to the sleeve 16 the collar 26 is bent back in correspondence with the inner course of the hollow contour, and the regions 26 of the collar 26 which abut against the guiding jaws 21, 21' of the sleeve 16, because of the narrow inner diameter of the guiding jaws 21, 21', are angled more than the regions 26" of the collar 26 which abut against the both remaining segments of the hollow contour with a greater diameter. Thereby the regions 26" associated with the segments of the sleeve 16 of the greater diameter extend at a greater angle from the tube longitudinal axis and form diametrically opposite arresting projections.

During insertion or coupling of the plug 13 and the sleeve 16 of the housing 11, the diametrically opposite arresting projections arrestingly engage in the throughgoing passages 20, 20'. The collar-side end 25 of the tube 24 abuts as an end abutment against the closed end side of the sleeve 16, and the arresting projections 26" form an opposite abutment with inner sides of the throughgoing passages 20, 20' which face correspondingly the open end side 18 of the sleeve 16. In this coupled condition the O-sealing ring 12 arranged in the ring grooves 23 is located between the outer wall of the tubular portion 14 of the housing 11 and the inner wall of the tube 24 of the plug 13.

Figure 3:
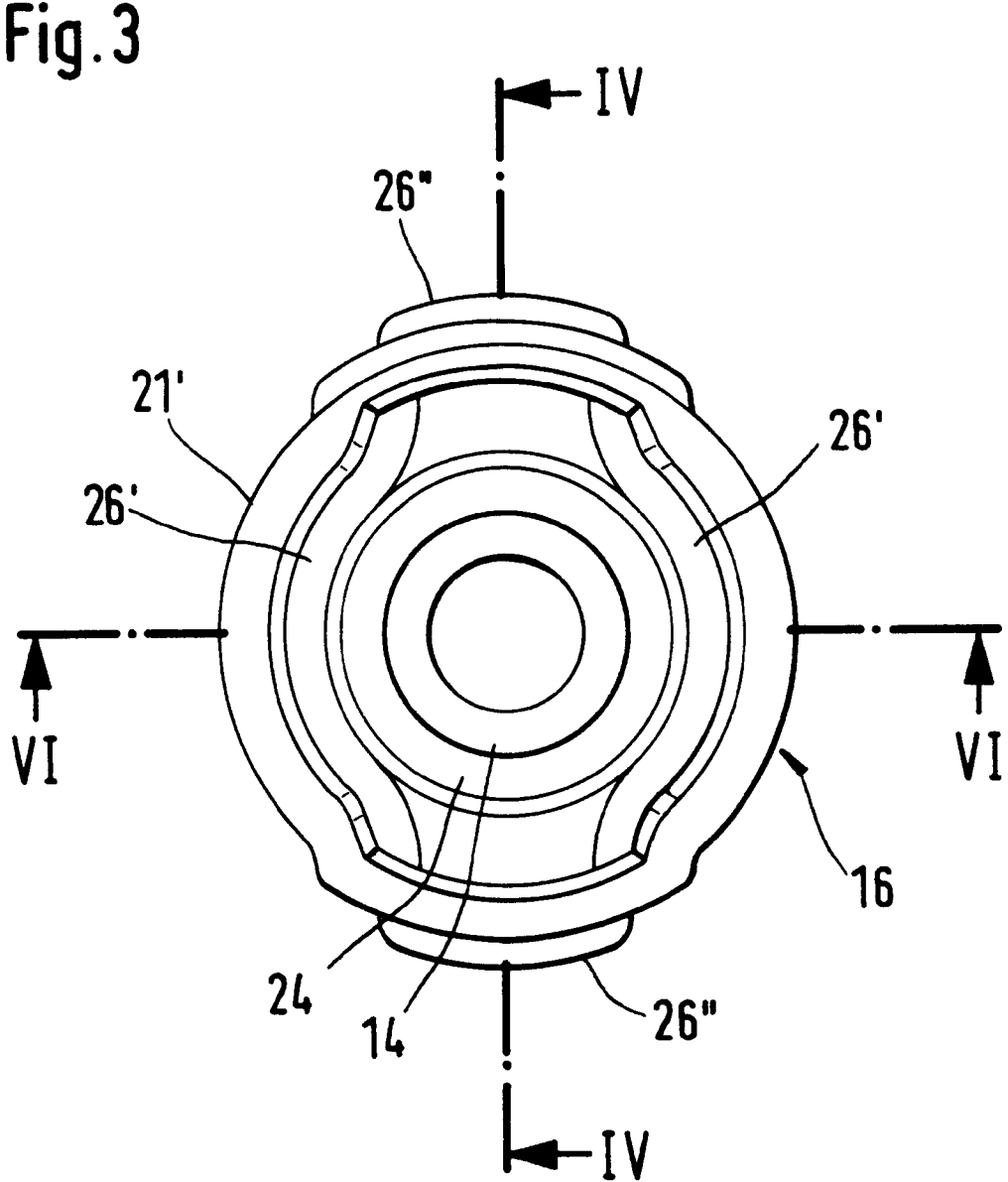
FIG. 3 is a view showing a transverse cross-section of the inventive plug connection device.

FIG. 3 shows the inventive plug connection device 10 in anchored and thereby arrested condition, in which the plug 13 is plugged in the housing 11 and arrested in it. For this purpose the collar 26 of the plug 13 is received in the outer collar of the sleeve 16, and the collar 26 is deformed. In particular, it deforms so that the regions 26' of the collar 26 which face the guiding jaws 21, 21' abut angularly against the inner surfaces of the guiding jaws 21, 21', and the intermediately arranged regions of the collar 26 engage as arresting projections extending from the tube 24 through the associated throughgoing passages 20, 20' in the outer collar of the sleeve 16. Since each of the flange-like arresting projections 26" is engaged in a form-locking manner by two opposite inner sides which limit the opening cross-section of the corresponding throughgoing passage 20, 20' in a radial direction, a reliable rotation prevention against a radial turning of the plug 13 in the anchored condition is obtained.

Figure 4:
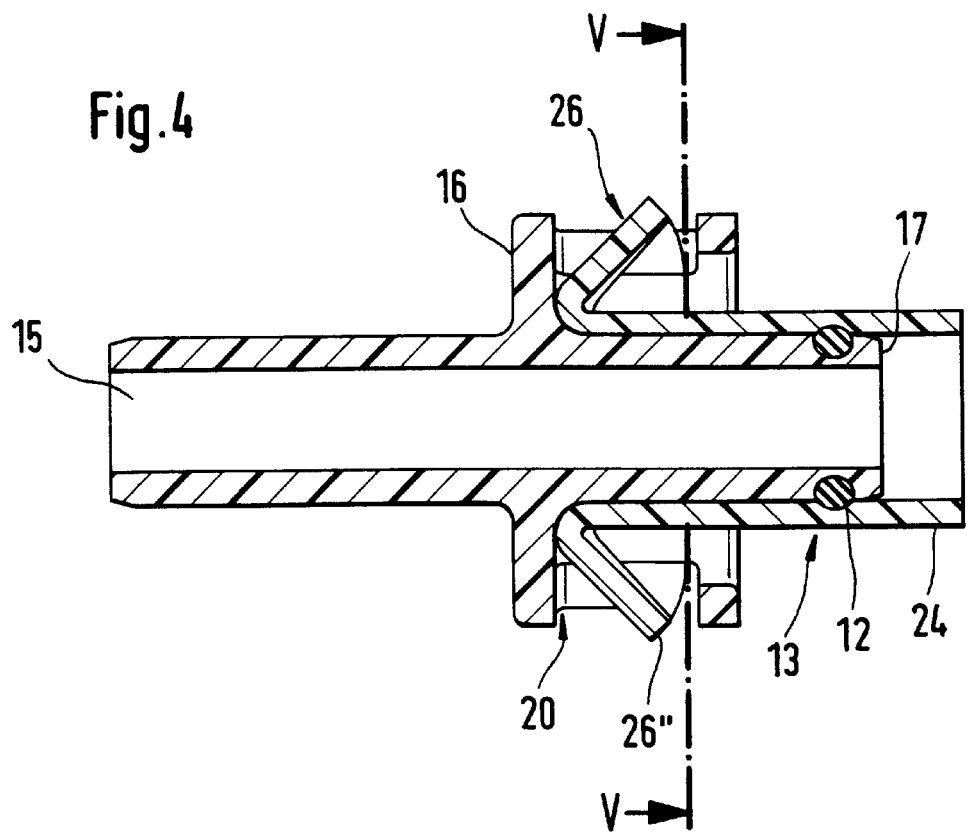
FIG. 4 is a view showing a longitudinal section of the plug connection device taken along the line IV—IV of FIG. 3, with arresting projections received in passages of a sleeve forming a part of a housing.

FIG. 4 illustrates the anchored and thereby arrested condition of the plug connection device 10, in which the arresting projections 26' of the plug 13 are received in the sleeve 16 of the housing 11 and with their free ends engage through the throughgoing openings 20, 20' of the outer collar. They each form an angle of approximately 45° to the outer wall of the tube 24. Since the collar-side end of the plug 13 axially abuts against the closed end side of the sleeve 16 and the flange-like arresting projections 26" of the collar 26 for this purpose form an axial opposite abutment with the inner sides of the throughgoing passages 20, 20' which face the open end side of the sleeve 16, a reliable securing against an axial turning of the plug in the anchored condition is obtained.

Figure 5:
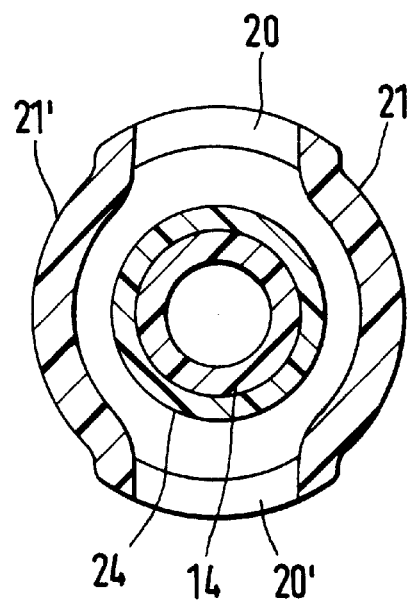
FIG. 5 is a view showing a cross-section taken along the line V—V in FIG. 4.
Figure 6:
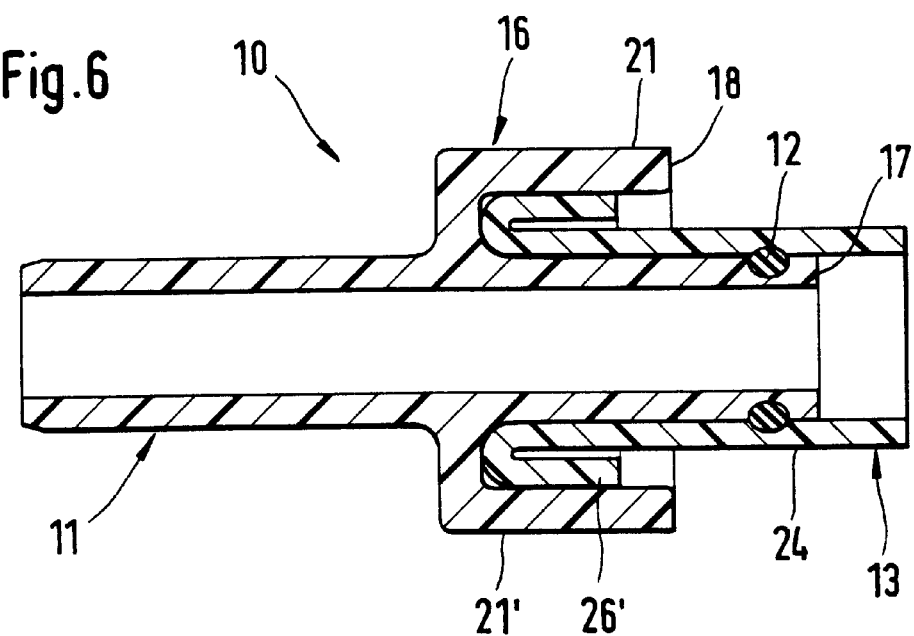
FIG. 6 is a view showing a longitudinal section of the plug connection device taken along the line VI—VI in FIG. 3, with bent back regions of the plug associated with guiding jaws of the sleeve.
Figure 7:
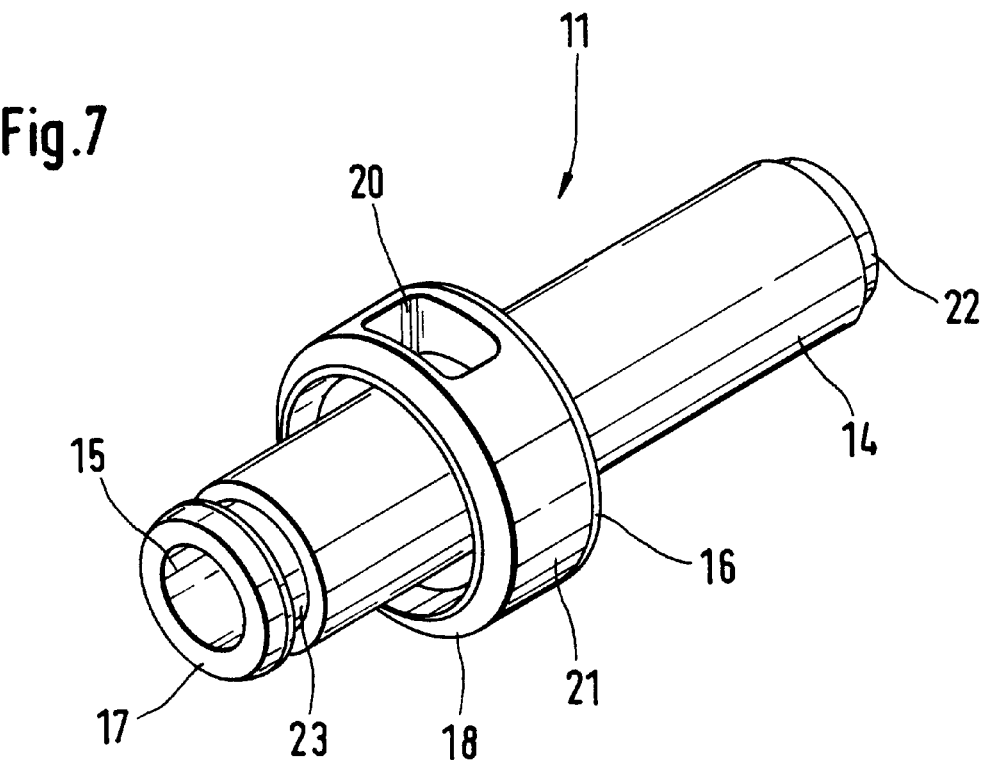
FIG. 7 shows a perspective view of a second alternative embodiment of the inventive plug connection device, with a housing provided for receiving of the plug and having a sleeve of a circular cross-section.

FIG. 5 shows a circular-arc curvature of the guiding jaws 21, 21' in the cross-section, which extends approximately over one quadrant and is concentric to the tubular portion 14 of the housing 11. Due to the concentric course of the guiding jaws 21, 21' to the corresponding adjacent outer wall portions of the tubular portion 14, together with its diameter narrowing a correspondingly narrower ring gap portion is formed for receiving the correspondingly associated region of the collar 26 and the plug tube 24 which comes to abutment. As can be seen from FIG. 6, in the anchored and thereby arrested condition of the plug connection device 10, the regions of the plug collar 26 which are pressed against the inner surfaces of the guiding jaws 21, 21' and abut against them are bent back substantially parallel to the outer wall of the plug tube 24. Therefore, a frictional connection between the guiding jaws 21, 21' and the associated regions of the collar 26 of the plug 13 is provided. The collar-side end 25 of the plug tube 24 is located in abutment with the closed end side of the sleeve 16.

An alternative embodiment of the housing 11 for the plug connection device 10 is shown in FIGS. 7–10. The parts which are identical to the parts of the embodiment of FIGS. 1–6 are identified with the same reference numerals. As can be seen particularly from FIG. 7, the housing 11 has a tubular portion 14 with a throughgoing opening 15 extending axially in a longitudinal direction. A ring-shaped sleeve 16 is arranged coaxially to the tubular portion 14. It has an open end side which faces the coupling-side end of the tubular portion 14, and a closed end side which faces to the free end 22 of the housing 11 and formed of one piece with the tubular portion 14. The sleeve 16 is provided with two diametrically opposite throughgoing passages 20, 20', located on its radial circumferential outer collar and provided for receiving the corresponding arresting projections 26" of the plug 13. This embodiment is different from the first embodiment substantially in that, the sleeve 16 of the housing 11 has a circular cross-section so that both the guiding jaws 21 and the portions provided with the throughgoing passages 20 are arranged on the same radius. The plug of the plug connection device 10 is formed identically to the first embodiment.

Figure 8:
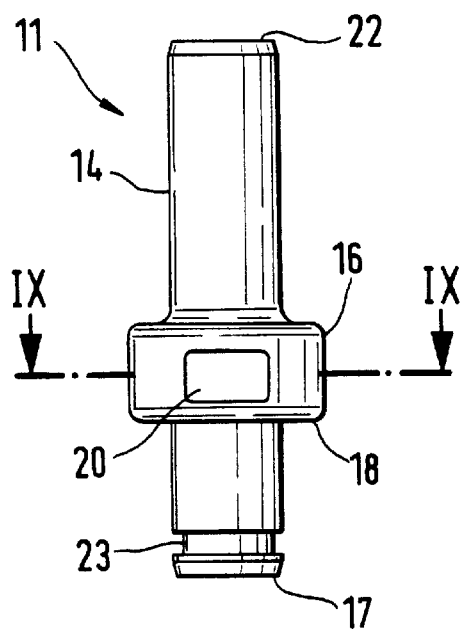
FIG. 8 shows a plan view of the housing in accordance with the alternative embodiment.
Figure 9:
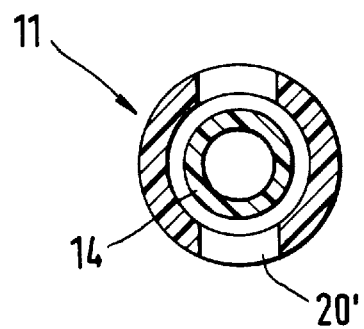
FIG. 9 is a view showing a cross-section taken along the line IX—IX in FIG. 8 through the sleeve.
Figure 10:
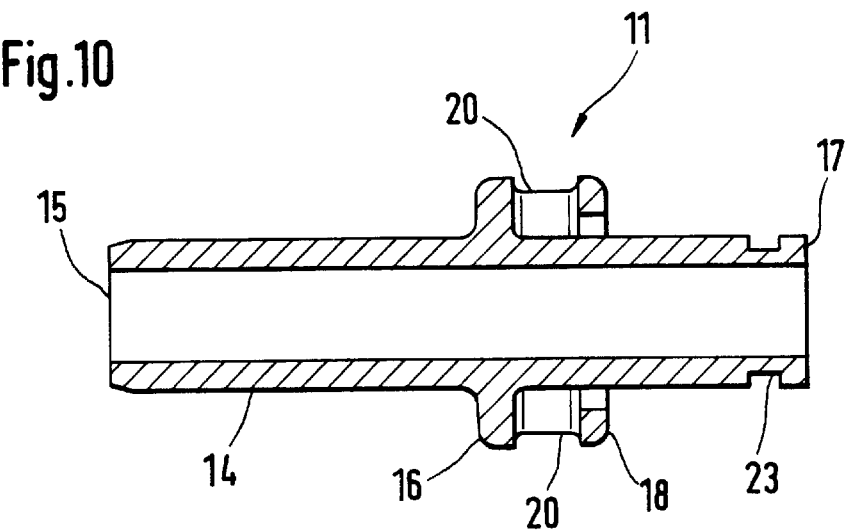
FIG. 10 is a view showing a longitudinal section of the housing.

FIG. 8 shows that the throughgoing passages 20 have a substantially rectangular opening cross-section. The edge length of the opening cross-section facing in the peripheral direction is greater than the edge length oriented transversely to it. FIG. 9 illustrates the circular shape of the cross-section of the sleeve 16. The passages 20 are arranged on the sleeve 16 diametrically opposite in a peripheral direction and the guiding jaws 21 are located between them. Since the outer collar of the sleeve 16 facing toward the guiding jaws 21 is arranged concentrically to the tubular portion 14, the thereby formed intermediate space is formed as a circumferential ring gap for receiving the associated region of the collar 26. FIG. 10 illustrates the sleeve 16 which is formed of one piece on the tubular portion 14 of the housing, with end sides which project in an axial direction and have inner edges forming corresponding axial abutments for the plug 13.

It is characteristic for the both embodiments of the invention that the plug 13 of the plug connection device 10 has a coupling region, which in not plugged-in condition of the plug 13 is formed as a substantially ring-shaped, circumferential collar 26, and during insertion in the receiving portion 16 of the housing 11, which is correspondingly formed as a sleeve is deformed so that, the flange-like arresting projections 26 which engage the arresting edges limiting the throughgoing openings are formed. For destruction-free release of the inventive plug connection device 10 from its anchored condition, a tool which preferably corresponds to the geometric arrangement of the throughgoing passages can be utilized.

An alternative embodiment of the inventive plug connection device 10 can be formed so that, the arresting projections 26" in correspondence with the embodiment of FIG. 1, as well as FIGS. 3–10 are formed by extruding the tube 24 of the plug which is composed preferably of polyamide and deforming at the tube end the collar 26 as well as the arresting projections 26' for example by thermal deformation. Thereby in the not inserted condition of the plug 13 the arresting projections 26 are formed flange-like and substantially radially projecting, while the intermediate regions 26' are turned in direction of the longitudinal axis of the plug. Therefore during insertion of the plug 13 in the associated housing, the regions 26' come frictionally to abutment against the corresponding guiding jaws 21, 21' of the housing, while the arresting projections 26" arrestingly engage through the corresponding throughgoing openings 20, 20' and spring in them.

Furthermore, the end of the housing 11 provided for receiving the pressure medium conduit can have a receiving region 14 with radially expanding thickenings which are spaced equidistantly in the axial direction. They are formed as conical ring shoulders and with their conically narrowing sides face toward the end 22. Thereby because of such a profiling, a tight and non releasable anchoring of a pressure medium conduit fitted on the end 22 of the housing 11 is guaranteed.

It will be understood that each of the elements described above, or two or more together, may also find a useful application in other types of constructions differing from the types described above.

While the invention has been illustrated and described as embodied in plug connection device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A plug connection device for pressure medium conduits, for binding or connection of fuel conduits, comprising a housing provided with arresting edges; a plug insertable in said housing, said plug having a coupling region which is not plugged-in condition of said plug is formed as a substantially ring-shaped circumferential collar, said collar being bent back at an acute angle to an axis of said plug during and after so that holding means engaging said arresting edges are formed at said collar, said receiving portion of said housing having a sleeve which is radially spaced from a radial tubular portion and has an open end side facing a coupling-side end of said tubular portion, and said sleeve having two opposite throughgoing openings which are located geometrically opposite to one another in a Peripheral direction and form inner-side arresting edges which face said open end side of said sleeve.

2. A plug connection device as defined in claim 1, wherein said plug has a plug shaft formed as a tube and having a coupling-side end with a coaxial collar.

3. A plug connection device as defined in claim 1, wherein said tubular portion of said plug has an inner diameter which substantially corresponds to an outer diameter of said tubular portion of said housing.

4. A plug connection device as defined in claim 2, wherein said receiving portion of said housing has a sleeve which is radially spaced from a radial tubular portion and has an open end side facing a coupling-side end of said tubular portion, said collar having a greater outer diameter than said open end side of said sleeve.

5. A plug connection device as defined in claim 1, wherein said throughgoing openings in said outer jacket of said sleeve have a substantially rectangular opening cross-section.

6. A plug connection device as defined in claim 1, wherein said sleeve in said outer jacket has two guiding jaws which are diametrically opposite in a peripheral direction so that said throughgoing openings are located between said guiding jaws.

7. A plug connection device as defined in claim 6, wherein said guiding jaws have a same radius and a smaller diameter than limiting portions which face said throughgoing openings.

8. A plug connection device as defined in claim 7, wherein in an anchored condition, regions of said collar which are associated with said guiding jaws angularly abut against inner surfaces of said guiding jaws in frictional manner.

9. A plug connection device for pressure medium conduits, for binding or connection of fuel conduits, comprising a housing provided with arresting edges; a plug insertable in said housing and having a coupling region with holding means which form-lockingly engage said arresting edges and which are formed at an end side on a tubular plug portion produced by extrusion, wherein the holding means has the shape of a collar which is bent back at an acute angle to an axis of said plug, said receiving portion of said housing having a sleeve which is radially spaced from a radial tubular portion and has an open end side facing a coupling-side end of said tubular portion, and said sleeve having two opposite throughgoing openings which are located geometrically opposite to one another in a peripheral direction and form inner-side arresting edges which face said open end side of said sleeve.

* * * * *